United States Patent
Murata et al.

(10) Patent No.: US 10,161,452 B2
(45) Date of Patent: Dec. 25, 2018

(54) BEARING RING FOR ROLLER BEARING, ROLLER BEARING, AND POWER TRANSMISSION DEVICE

(71) Applicant: JTEKT CORPORATION, Osaka-shi, Osaka (JP)

(72) Inventors: Junji Murata, Kashiba (JP); Shigeo Kamamoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 446 days.

(21) Appl. No.: 14/681,517

(22) Filed: Apr. 8, 2015

(65) Prior Publication Data

US 2015/0300410 A1     Oct. 22, 2015

(30) Foreign Application Priority Data

Apr. 16, 2014   (JP) .................................. 2014-084870

(51) Int. Cl.
   *F16C 33/58*        (2006.01)
   *F16C 33/34*        (2006.01)
   (Continued)

(52) U.S. Cl.
   CPC ............ *F16C 33/585* (2013.01); *F16C 33/34* (2013.01); *F16C 33/366* (2013.01);
   (Continued)

(58) Field of Classification Search
   CPC ...... F16C 33/34; F16C 33/585; F16C 33/586; F16C 33/366; F16C 2240/50; F16C 19/364; F16C 19/225; F16C 2220/70
   See application file for complete search history.

(56) References Cited

U.S. PATENT DOCUMENTS

| | | | |
|---|---|---|---|
| 5,492,419 A * | 2/1996 | Miller ................... | F16C 19/386 384/477 |
| 6,379,049 B1 * | 4/2002 | Shibazaki ............. | F16C 19/225 384/450 |

(Continued)

FOREIGN PATENT DOCUMENTS

| JP | S61-082017 A | 4/1986 |
|---|---|---|
| JP | H04-90721 U | 8/1992 |

(Continued)

OTHER PUBLICATIONS

Nov. 28, 2017 Office Action issued in Japanese Patent Application No. 2014-084870.

*Primary Examiner* — Alan B Waits
(74) *Attorney, Agent, or Firm* — Oliff PLC

(57) ABSTRACT

A bearing ring includes a raceway surface on which a roller of a roller bearing rolls, a rib portion end face that is provided on one side of the raceway surface in an axial direction and that faces a roller end face of the roller in which at least an outer circumferential side of the roller end face is a convex curved surface portion, and a recessed portion having a recessed shape provided in a corner between the raceway surface and the rib portion end face. The rib portion end face includes a contacting surface portion that the roller end face contacts, and a concave curved surface portion that is provided between the contacting surface portion and the recessed portion and that is smoothly continuous with the contacting surface portion. A curvature radius of the concave curved surface portion is greater than that of the convex curved surface portion.

17 Claims, 6 Drawing Sheets

(51) Int. Cl.
  *F16C 33/36* (2006.01)
  *F16C 19/36* (2006.01)
(52) U.S. Cl.
  CPC ........ *F16C 19/364* (2013.01); *F16C 2220/70* (2013.01); *F16C 2240/50* (2013.01)

(56) References Cited

U.S. PATENT DOCUMENTS

| | | | | |
|---|---|---|---|---|
| 6,423,158 B1 * | 7/2002 | Maeda | .................... | F16C 33/62 |
| | | | | 148/219 |
| 6,547,443 B2 * | 4/2003 | Hanai | .................... | F16C 19/225 |
| | | | | 384/450 |
| 6,623,168 B2 * | 9/2003 | Matsuyama | .......... | F16C 19/225 |
| | | | | 384/450 |
| 6,767,134 B2 * | 7/2004 | Murai | .................... | F16C 19/225 |
| | | | | 384/565 |
| 7,416,346 B2 * | 8/2008 | Takemura | ............. | F16C 19/225 |
| | | | | 384/450 |
| 7,871,201 B2 * | 1/2011 | Ohshima | ............... | F16C 19/364 |
| | | | | 384/564 |
| 7,874,737 B2 | 1/2011 | Matsuyama et al. | | |
| 8,596,877 B2 * | 12/2013 | Kanbori | ................. | B60B 35/18 |
| | | | | 384/571 |
| 8,899,839 B2 * | 12/2014 | Liang | .................... | F16C 19/225 |
| | | | | 384/564 |
| 9,188,160 B2 * | 11/2015 | Liang | .................... | F16C 19/364 |
| 9,249,833 B2 * | 2/2016 | Murata | ................. | F16C 33/366 |
| 9,435,372 B2 * | 9/2016 | Murata | ................. | F16C 33/366 |
| 9,599,160 B2 * | 3/2017 | Murata | ................. | F16C 33/366 |
| 9,618,043 B2 * | 4/2017 | Liang | .................... | F16C 19/225 |
| 2003/0198421 A1 * | 10/2003 | Serafini | ................ | F16C 19/364 |
| | | | | 384/571 |
| 2007/0041678 A1 * | 2/2007 | Matsuyama | .......... | F16C 19/225 |
| | | | | 384/571 |
| 2015/0300410 A1 * | 10/2015 | Murata | ................. | F16C 33/585 |
| | | | | 384/571 |
| 2016/0186810 A1 * | 6/2016 | Murata | ................. | F16C 33/585 |
| | | | | 384/571 |
| 2016/0298677 A1 * | 10/2016 | Katou | .................... | F16C 33/34 |

FOREIGN PATENT DOCUMENTS

| | | |
|---|---|---|
| JP | H04-122813 U | 11/1992 |
| JP | H04-331813 A | 11/1992 |
| JP | 2006-009891 A | 1/2006 |
| JP | 2007-051702 A | 3/2007 |
| JP | 2007-218292 A | 8/2007 |

\* cited by examiner

BEARING RING FOR ROLLER BEARING, ROLLER BEARING, AND POWER TRANSMISSION DEVICE

INCORPORATION BY REFERENCE

The disclosure of Japanese Patent Application No. 2014-084870 filed on Apr. 16, 2014 including the specification, drawings and abstract is incorporated herein by reference in its entirety.

BACKGROUND OF THE INVENTION

1. Field of the Invention

The invention relates to a bearing ring for a roller bearing, a roller bearing, and a power transmission device.

2. Description of Related Art

A tapered roller bearing has characteristics that a load capacity is large and rigidity is high compared to the other rolling bearings of the same size. A tapered roller bearing is disclosed in Japanese Utility Model Application Publication No. 4-90721 (JP 4-90721 U), for example. FIG. 5 is a partial cross-sectional view showing a tapered roller bearing 51 of a related art. As shown in FIG. 5, in the tapered roller bearing 51, an inner ring raceway surface 52a on which a tapered roller 53 rolls, and a cone back face rib (hereinafter referred to as a large rib) portion 54, disposed on one side of the inner ring raceway surface 52a in the axial direction, are formed on an outer circumference of the inner ring 52. A large end face (roller end face) 53a of the tapered roller 53 slidably contacts an end face (large rib portion end face) 54a of the large rib portion 54, which is on the inner ring raceway surface 52a side. A grinding undercut portion (hereinafter referred to as a recessed portion) 55 for facilitating the grinding processing of the large rib portion end face 54a by a rotary grindstone is formed in a corner between the inner ring raceway surface 52a and the large rib portion end face 54a so as to be recessed over the entire circumference.

In the tapered roller bearing 51, a contacting position (contacting height) of the roller end face 53a having a convex curved surface and the large rib portion end face 54a having a concave curved surface in a radial direction is preferably positioned (lowered) on a radially inner side as much as possible (see arrow in FIG. 5) so that a friction of the roller end face 53a and the large rib portion end face 54a is small.

A contacting surface of the roller end face 53a and the large rib portion end face 54a is an ellipse (contact ellipse). The contact ellipse overlaps an edge (end edge) 55a of the recessed portion 55, which is on the large rib portion end face 54a side, if the contacting height is low as described above. The roller end face 53a may contact the edge 55a, which may cause an edge load and shorten the life of the tapered roller bearing 51. In particular, the edge load easily occurs when a high axial load acts on the tapered roller bearing 51 and the contact ellipse becomes large. Suppressing the edge load requires forming the recessed portion 55 small.

The edge load, however, may occur as will be described below even if the recessed portion 55 is formed small. FIG. 6A and FIG. 6B are each an explanatory view showing a production step of the inner ring 52 of the related art. FIG. 6C is an explanatory view showing a partial cross-section of the produced inner ring 52. As shown in FIG. 6A, in the production of the inner ring 52 of the related art, the recessed portion 55 is formed in an inner ring blank 57 for forming the inner ring 52. Next, as shown in FIG. 6B, the grinding processing is carried out by the outer circumferential surface of a disc-shaped rotary grindstone 58 as a finish machining process on a processing surface 54af of the large rib portion 54. The surface obtained by the finish machining process is the large rib portion end face 54a.

In this case, if the recessed portion 55 is formed small, the outer circumferential portion of the rotary grindstone 58 cannot enter inside the recessed portion 55. Thus, as shown in FIG. 6C, a non-ground portion 60, where the grinding processing is not carried out by the rotary grindstone 58, is formed on the inner circumferential side of the large rib portion end face 54a. Accordingly, a step 62 is formed at a boundary of the non-ground portion 60 and a ground portion 61, where the grinding processing is performed by the rotary grindstone 58. Thus, if the contacting height is made low, the roller end face 53a may contact a step 62 side corner (edge) 60a of the non-ground portion 60, and the edge load may be caused. In FIG. 6C, the step 62 is illustrated in an exaggerated manner to facilitate the understanding, but the actual step 62 is small.

SUMMARY OF THE INVENTION

It is an object of the present invention to provide a bearing ring for a roller bearing that can suppress an occurrence of an edge load, a roller bearing, and a power transmission device.

According to an aspect of the present invention, a bearing ring for a roller bearing includes: a raceway surface on which a roller of a roller bearing rolls; a rib portion end face that is provided on one side of the raceway surface in an axial direction and that faces a roller end face of the roller in which at least an outer circumferential side of the roller end face is a convex curved surface portion; and a recessed portion having a recessed shape provided in a corner between the raceway surface and the rib portion end face. In the bearing ring, the rib portion end face includes a contacting surface portion that the roller end face contacts, and a concave curved surface portion that is provided between the contacting surface portion and the recessed portion and that is smoothly continuous with the contacting surface portion, and a curvature radius of the concave curved surface portion is greater than a curvature radius of the convex curved surface portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
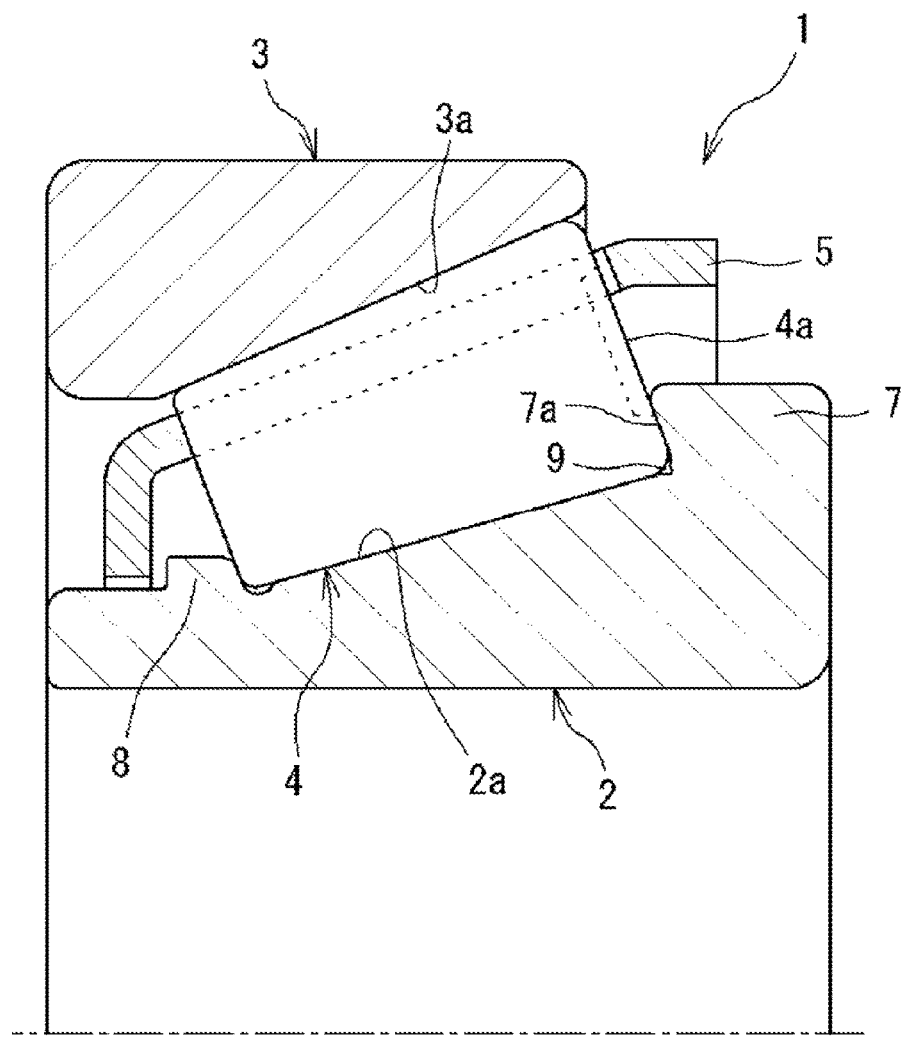
FIG. 1 is an axial cross-sectional view of a tapered roller according to an embodiment of the present invention.

A preferred embodiment of the present invention will be described with reference to the accompanying drawings. FIG. 1 is an axial cross-sectional view of a tapered roller bearing according to one embodiment of the present invention. As shown in FIG. 1, the tapered roller bearing 1 includes an inner ring 2, an outer ring 3, a plurality of tapered rollers 4, and a cage 5. The outer ring 3 is concentrically arranged on the outer circumferential side of the inner ring 2. The tapered rollers 4 are disposed between the inner and outer rings 2, 3. The cage 5 holds the tapered rollers 4 at predetermined intervals along the circumferential direction. The inner ring 2 is an annular member formed from a bearing steel, a steel for machine structural use, and the like. An inner ring raceway surface 2a, a large rib portion 7, and a cone front face rib (hereinafter, referred to as a small rib) portion 8 are formed on the outer circumference of the inner ring 2. The large rib portion 7 and the small rib portion 8 project radially outward. The tapered rollers 4 rolls on the inner ring raceway surface 2a. The large rib portion 7 is disposed on one side of the inner ring raceway surface 2a in the axial direction. The small rib portion 8 is disposed on the other side of the inner ring raceway surface 2a in the axial direction. A recessed portion 9 is provided in a corner between the inner ring raceway surface 2a and a large rib portion end face 7a so as to be recessed over the entire circumference. Forming the recessed portion 9 facilitates the cutting work by a cutting tool on a surface to be the inner ring raceway surface 2a and the large rib portion end face 7a and the grinding processing by the rotary grindstone on the large rib portion end face 7a.

The outer ring 3 is also an annular member formed from a bearing steel, a steel for machine structural use, and the like, similar to the inner ring 2. An outer ring raceway surface 3a on which the tapered rollers 4 roll, is formed on the inner circumference of the outer ring 3 so as to face the inner ring raceway surface 2a. The tapered rollers 4 are members formed from a bearing steel, and the like, and are disposed between the inner ring raceway surface 2a and the outer ring raceway surface 3a so as to be rollable. A large end face (roller end face) 4a of each of the tapered rollers 4 is formed in the shape of a convex curved surface and slidably contacts the large rib portion end face 7a. The rotation of the tapered rollers 4 is thereby guided, and a thrust load acting on the tapered rollers 4 is received by the large rib portion 7.

Figure 2:
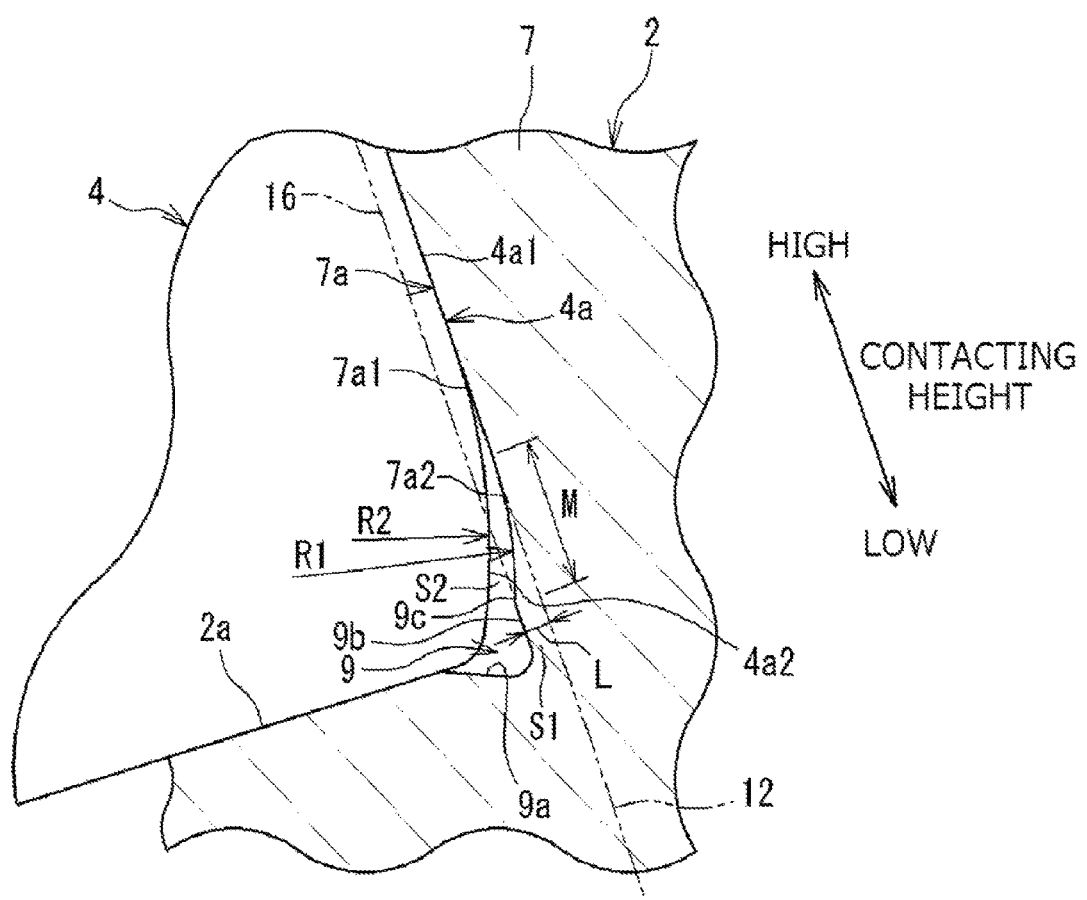
FIG. 2 is a partially enlarged view of FIG. 1.

FIG. 2 is an enlarged view of the recessed portion 9 and a peripheral portion thereof in FIG. 1. As shown in FIG. 2, the large rib portion end face 7a includes a contacting surface portion 7a1 on the outer circumferential side and a concave curved surface portion 7a2. The roller end face 4a is in contact (slide contact) with the contacting surface portion 7a1. The concave curved surface portion 7a2 is provided between the contacting surface portion 7a1 and the recessed portion 9. The contacting surface portion 7a1 is a plane herein but may be a concave curved surface. In this case, the large rib portion end face 7a is a concave curved surface. M in FIG. 2 indicates a region of the concave curved surface portion 7a2 in the axial cross-section. The concave curved surface portion 7a2 is a surface that is smoothly continuous with to the contacting surface portion 7a1. The phrase "smoothly continuous" means that there is no structure that inhibits the "smoothness", such as a step, a projection, and a recess, at a boundary (connecting portion, continuing portion) of the concave curved surface portion 7a2 and the contacting surface portion 7a1. The dimension of a curvature radius R1 of the concave curved surface portion 7a2 at the axial cross-section is about 80 to 100 mm. The recessed portion 9 is provided on an axially inner side (left side in FIG. 2) of a virtual extending plane 12 extending to the recessed portion 9 (radially inward) from the contacting surface portion 7a1 of the large rib portion end face 7a. A dimension L of a space S1 between the recessed portion 9 and the virtual extending plane 12 is about a few micrometers. The dimension L of the space S1 is a grinding depth for forming the contacting surface portion 7a1 through grinding (described later). The recessed portion 9 includes a concave surface portion 9a and an annular planar portion 9b. The concave surface portion 9a is recessed in the radial direction from the inner ring raceway surface 2a. The annular planar portion 9b is provided between the concave surface portion 9a and the concave curved surface portion 7a2. The planar portion 9b is continuous with the concave curved surface portion 7a2 at an edge (end edge) 9c thereof on the axially outer side (right side of FIG. 2). The term axially inner side means the interior side of the tapered roller bearing 1 in the axial direction. The term axially outer side means the exterior side of the tapered roller bearing 1 in the axial direction.

The roller end face 4a includes a slidably contacting portion 4a1 on the inner circumferential side that is in slide contact with the contacting surface portion 7a1, and a convex curved surface portion 4a2 on the outer circumferential side that faces the recessed portion 9 and the concave curved surface portion 7a2. A curvature radius R2 of the convex curved surface portion 4a2 in the axial cross-section is smaller than the curvature radius R1 of the concave curved surface portion 7a2 in the axial cross-section. Thus, when the concave curved surface portion 7a2 is assumed as a reference, a space S2 between the concave curved surface portion 7a2 and the convex curved surface portion 4a2 gradually becomes larger as the concave curved surface portion 7a2 extends radially inwardly, and an interval (gap) between the edge 9c of the recessed portion 9 on the concave curved surface portion 7a2 side and the convex curved surface portion 4a2 is sufficiently large. The convex curved surface portion 4a2 is not a usual chamfered portion. In the tapered roller bearing 1, the contacting position (contacting height) of the roller end face 4a and the large rib portion end face 7a is preferably positioned (lowered) on the radially inner side as much as possible (see arrow in FIG. 2) so that the friction between the roller end face 4a and the large rib portion end face 7a is small.

Figure 5:
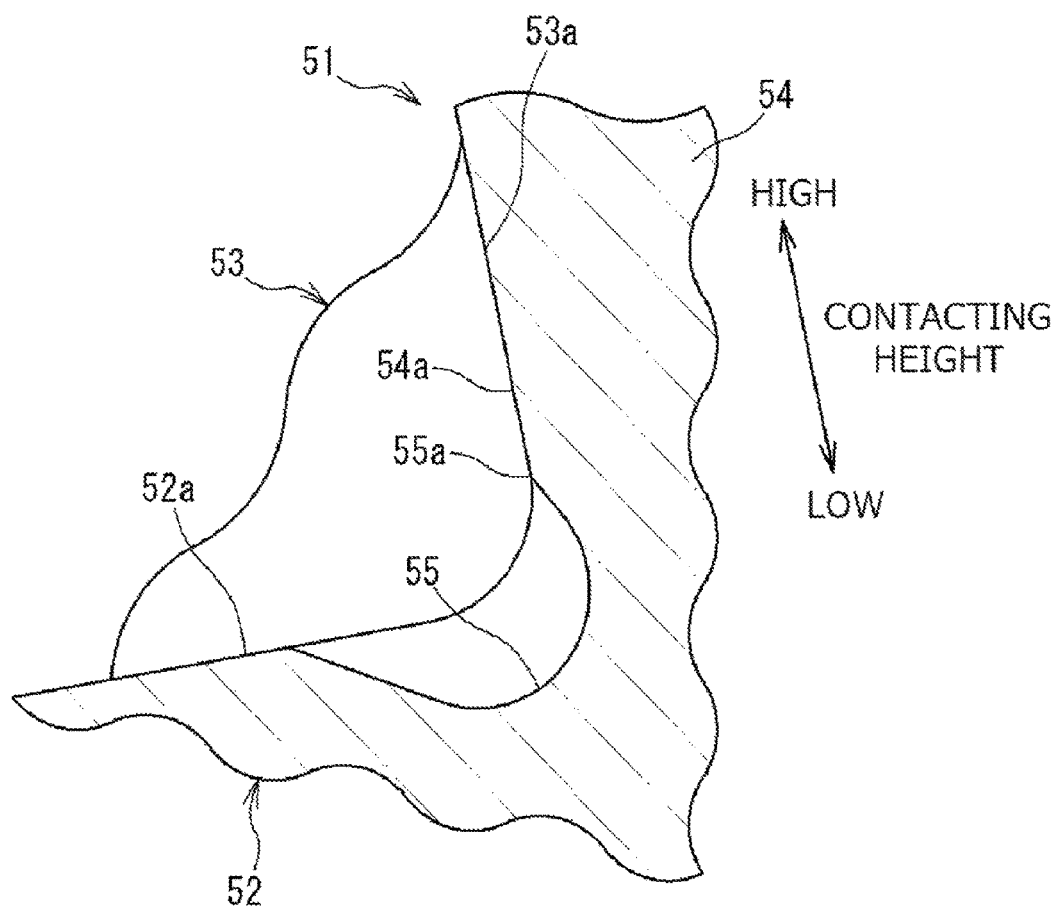
FIG. 5 is a partial cross-sectional view showing an inner ring of a related art.
Figure 6A:
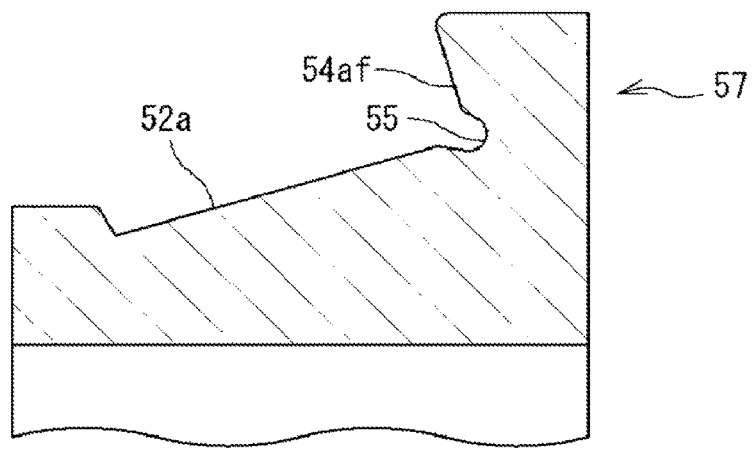
FIGS. 6A and 6B are explanatory views each showing a production step of the inner ring of the related art.
Figure 6B:
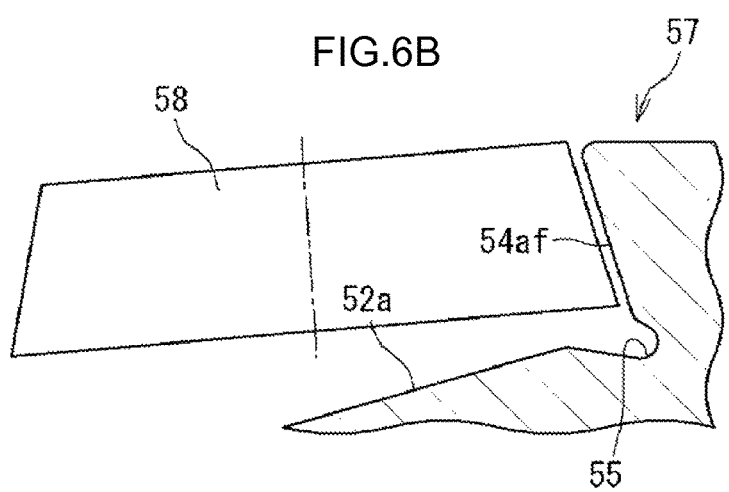
Figure 6C:
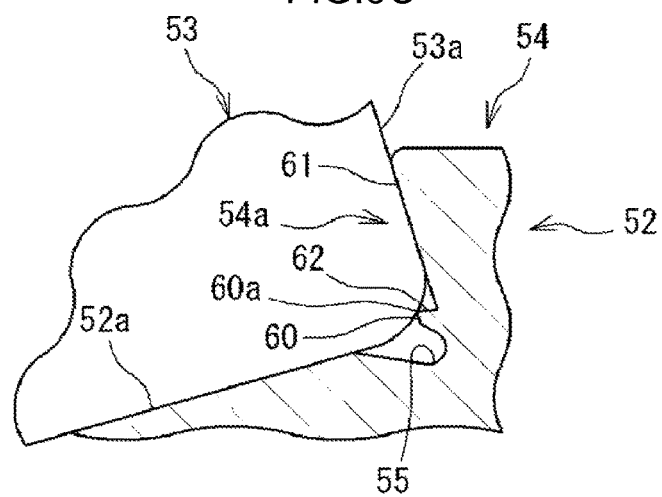
FIG. 6C is an explanatory view showing a partial cross-section of the produced inner ring.

In the related art shown in FIG. 5, if the contacting height is made low, the contact ellipse, which is the contacting surface of the roller end face 53a and the large rib portion end face 54a, overlaps the edge 55a of the recessed portion 55 on the large rib portion end face 54a side, and the roller end face 53a contacts the edge 55a, which causes an edge load. In particular, the edge load easily occurs if a high axial load acts on the tapered roller bearing 51 and the contact ellipse becomes large.

In the present embodiment shown in FIG. 2, on the other hand, the occurrence of the edge load is suppressed in the following manner. That is, in the present embodiment, the inner circumferential side (recessed portion 9 side) of the large rib portion end face 7a is the concave curved surface portion 7a2 that faces the convex curved surface portion 4a2 of the roller end face 4a on the outer circumferential side. The curvature radius R1 of the concave curved surface portion 7a2 in the axial cross-section is greater than the curvature radius R2 of the convex curved surface portion 4a2 in the axial cross-section. Thus, the space S2 between the concave curved surface portion 7a2 and the convex curved surface portion 4a2 gradually becomes larger as the concave curve surface portion 7a2 extends radially inwardly, and the interval (gap) of the edge 9c of the recessed portion 9 on the concave curved surface portion 7a2 side (axially outer side) and the convex curved surface portion 4a2 is sufficiently large. Accordingly, even if the contacting height is made low and the contact ellipse, which is the contacting surface of the roller end face 4a and the large rib portion end face 7a, is brought closer to the inner ring raceway surface 2a side in the radial direction, it is possible to suppress contact between the convex curved surface portion 4a2 and the edge 9c of the recessed portion 9. As a result, the occurrence of the edge load caused by such contact can be suppressed. In the present embodiment, the inner circumferential side (recessed portion 9 side) of the large rib portion end face 7a is the concave curved surface portion 7a2 as described above. The concave curved surface portion 7a2 is a surface that is smoothly continuous with the contacting surface portion 7a1. A step, a projection, a recess, or the like that contacts the roller end face 4a does not exist at the boundary between the concave curved surface portion 7a2 and the contacting surface portion 7a1. Therefore, even if the roller end face 4a contacts the boundary between the concave curved surface portion 7a2 and the contacting surface portion 7a1, the occurrence of the edge load caused by such contact can be prevented.

Figure 3A:
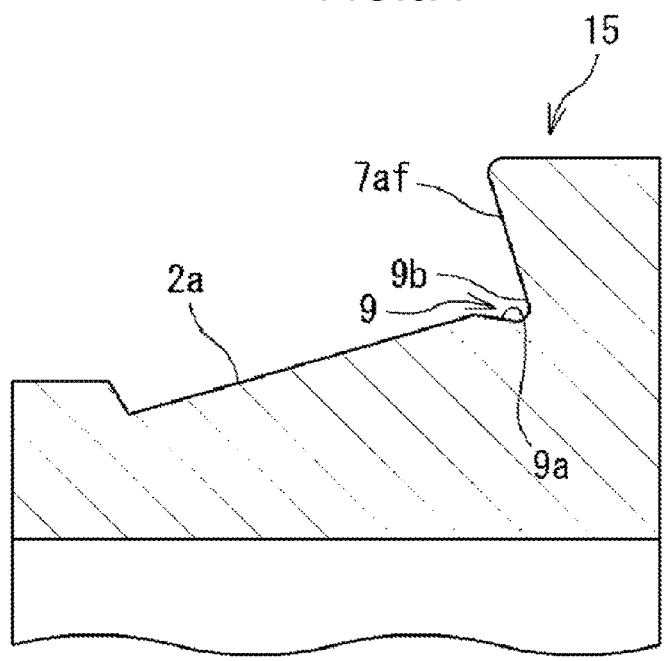
FIGS. 3A and 3B are explanatory views each showing a production step of the inner ring of FIG. 1.
Figure 3B:
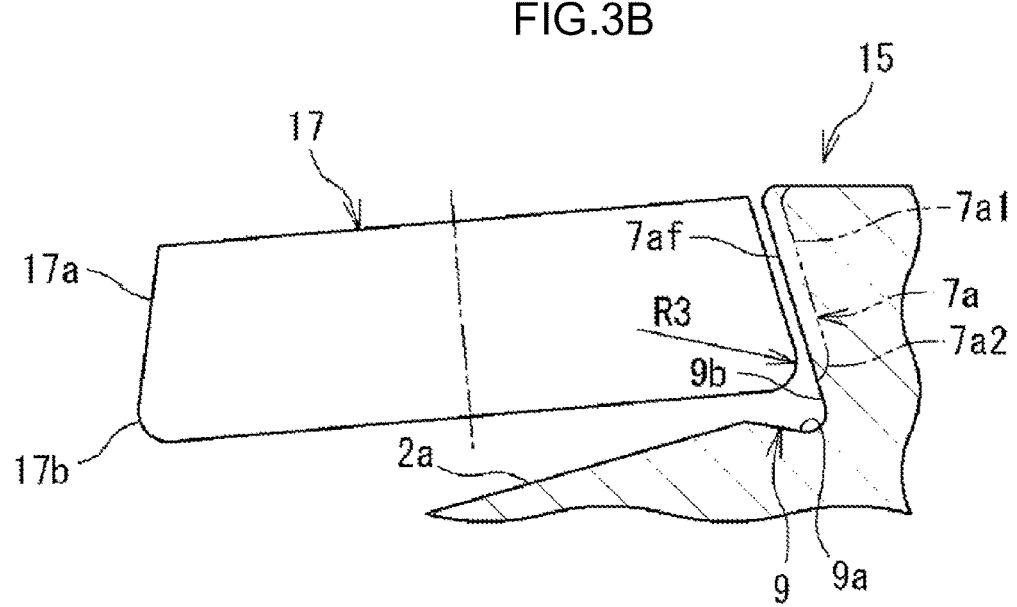

Next, a method for producing the inner ring 2 will be described. FIGS. 3A and 3B are each an explanatory view showing a production step of the inner ring 2. As shown in FIG. 3A, in the production of the inner ring 2, the recessed portion 9 is formed in an inner ring blank 15 for forming the inner ring 2. Forming the recessed portion 9 creates a surface to be processed 7af (see FIG. 3) that is a surface of the large rib portion end face 7a before finish machining and that serves as a virtual extending plane 16 (see FIG. 2) that extends radially outwardly from the planar portion 9b of the recessed portion 9.

As shown in FIG. 3B, after the recessed portion 9 is formed, the grinding processing is performed, as the finish machining, on the surface to be processed 7af with the outer circumferential surface of a rotary grindstone 17 to form the contacting surface portion 7a1 and the concave curved surface portion 7a2 of the large rib portion end face 7a. The rotary grindstone 17 has a disc shape, and the outer circumferential surface thereof excluding a lower portion is a first grinding portion 17a, which is a conical surface having a non-constant diameter with respect to the axial direction. The contacting surface portion 7a1 is formed by the first grinding portion 17a. The outer circumferential surface of the lower portion of the rotary grindstone 17 is a second grinding portion 17b in which the diameter reduces toward the lower side in the axial direction. The second grinding portion 17b is provided for forming the concave curved surface portion 7a2, and is formed to have a convex curved surface matching the concave curved surface portion 7a2. A curvature radius R3 of the second grinding portion 17b in the axial cross-section is the same as the curvature radius R1 of the concave curved surface portion 7a2 in the axial cross-section. The convex curved surfaced shape of the second grinding portion 17b is transferred through grinding by the second grinding portion 17b, and the concave curved surface portion 7a2 is easily formed. The outer circumferential surface of the rotary grindstone 17 may be formed to a convex curved surface over the entire surface.

Figure 4:
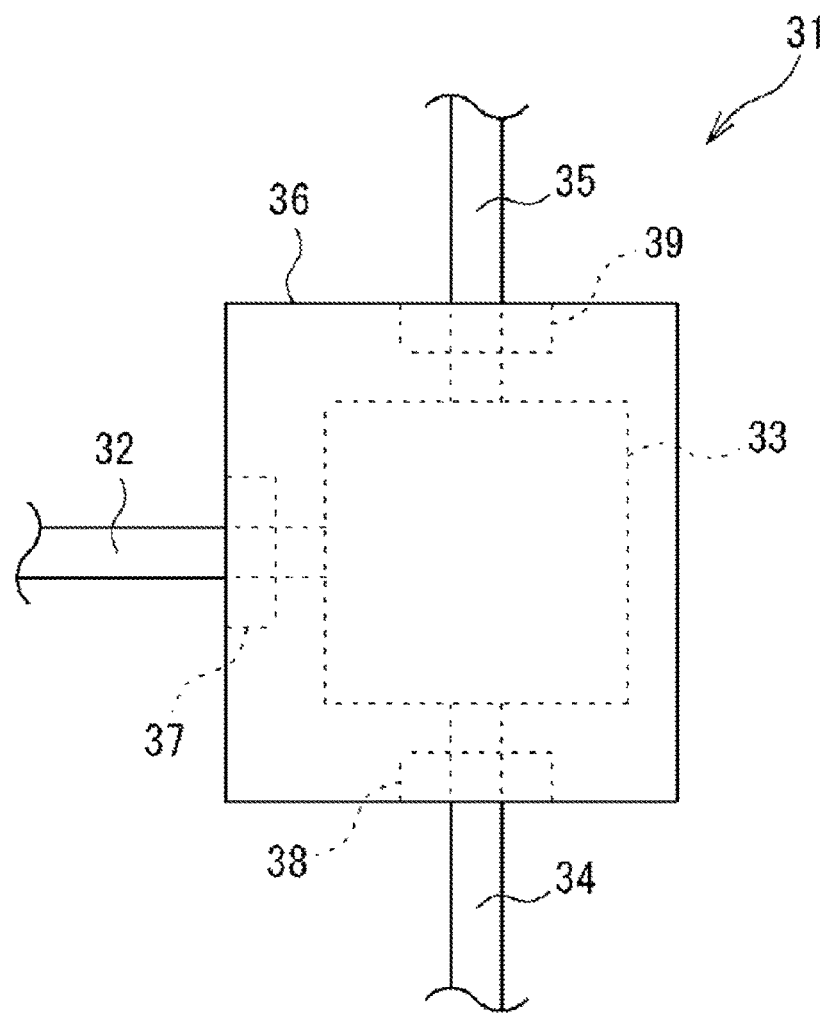
FIG. 4 is an explanatory view of a power transmission device according to an embodiment of the present invention.

FIG. 4 is an explanatory view of a power transmission device 31 of an automobile. As shown in FIG. 4, in the power transmission device 31, right and left axles 34, 35 are driven by a drive shaft 32 via a differential 33. The differential 33 is built in a housing 36 serving as a supporting body and the drive shaft 32 and the axles 34, 35, which are power transmission shafts, are supported via tapered roller bearings 37 to 39 according to the present invention so as to be rotatable.

In the embodiment described above, the bearing ring having a rib portion end face, which the roller end faces slidably contact, is the inner ring having the large rib portion in the tapered roller bearing, but the bearing ring may be an outer ring. Furthermore, in the embodiment described above, the rollers are tapered rollers, but the rollers may be cylindrical rollers. Furthermore, in the embodiment described above, the power transmission device of the present invention is applied to a power transmission device of a differential system of the automobile, but the power transmission device of the present invention can be applied to a transmission and other power transmission devices of the automobile.

According to the present invention, the edge load that occurs between the roller end faces and the bearing ring can be suppressed.

What is claimed is:

1. A bearing ring for a roller bearing comprising:
   a raceway surface that is configured to receive a roller such that the roller rolls on the raceway surface;
   a rib portion end face that is provided on a first side of the raceway surface in an axial direction and that is configured to face a roller end face of the roller; and
   a recessed portion that has a recessed shape and that is provided in a corner between the raceway surface and the rib portion end face,
   wherein:
      the rib portion end face includes a contacting surface portion that is configured to contact the roller end face, and a concave curved surface portion that is provided between the contacting surface portion and the recessed portion and that is smoothly continuous with the contacting surface portion,
      the contacting surface portion is a planar surface and the concave curved surface portion is a curved surface, and
      the concave curved surface portion includes a curvature of radius such that a gap is configured to be disposed between the concave curved surface portion and a convex curved surface portion of the roller.

2. The bearing ring for a roller bearing according to claim 1, wherein the recessed portion includes a concave surface portion that is recessed in a radial direction from the raceway surface, and an annular planar portion that is provided between the concave surface portion and the concave curved surface portion and that is positioned on a raceway surface side of the contacting surface portion.

3. The bearing ring for a roller bearing according to claim 2, wherein the concave curved surface portion includes a grinding surface that is formed with a rotary grindstone.

4. The bearing ring for a roller bearing according to claim 3, wherein the bearing ring for the roller bearing is an inner ring.

5. A roller bearing comprising:
   an inner ring and an outer ring; and
   a plurality of rollers disposed between the inner ring and the outer ring so as to be rollable, wherein the inner ring or the outer ring is the bearing ring for a roller bearing according to claim 3.

6. A power transmission device comprising:
a power transmission shaft disposed on a power transmission path; and
the roller bearing according to claim 5 that rotatably supports the power transmission shaft.

7. The bearing ring for a roller bearing according to claim 2, wherein the bearing ring for the roller bearing is an inner ring.

8. A roller bearing comprising:
an inner ring and an outer ring; and
a plurality of rollers disposed between the inner ring and the outer ring so as to be rollable,
wherein the inner ring or the outer ring is the bearing ring for a roller bearing according to claim 2.

9. A power transmission device comprising:
a power transmission shaft disposed on a power transmission path; and
the roller bearing according to claim 8 that rotatably supports the power transmission shaft.

10. The bearing ring for a roller bearing according to claim 1, wherein the concave curved surface portion includes a grinding surface that is formed with a rotary grindstone.

11. The bearing ring for a roller bearing according to claim 10, wherein the bearing ring for the roller bearing is an inner ring.

12. A roller bearing comprising:
an inner ring and an outer ring; and
a plurality of rollers disposed between the inner ring and the outer ring so as to be rollable,
wherein the inner ring or the outer ring is the bearing ring for a roller bearing according to claim 10.

13. A power transmission device comprising:
a power transmission shaft disposed on a power transmission path; and
the roller bearing according to claim 12 that rotatably supports the power transmission shaft.

14. The bearing ring for a roller bearing according to claim 1, wherein the bearing ring for the roller bearing is an inner ring.

15. A roller bearing comprising:
an inner ring and an outer ring; and
a plurality of rollers disposed between the inner ring and the outer ring so as to be rollable,
wherein the inner ring or the outer ring is the bearing ring for a roller bearing according to claim 1.

16. A power transmission device comprising:
a power transmission shaft disposed on a power transmission path; and
the roller bearing according to claim 15 that rotatably supports the power transmission shaft.

17. The bearing ring for a roller bearing according to claim 1, wherein the recessed portion is disposed on an axially inner side of a virtual extending plane that extends from the contacting surface portion of the rib portion end face.

* * * * *